(12) United States Patent
Yamashita et al.

(10) Patent No.: US 7,314,056 B2
(45) Date of Patent: Jan. 1, 2008

(54) HYDROGEN SUPPLY METHOD

(75) Inventors: Ikuya Yamashita, Wako (JP); Norio Komura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 10/737,740

(22) Filed: Dec. 18, 2003

(65) Prior Publication Data

US 2004/0123898 A1    Jul. 1, 2004

(30) Foreign Application Priority Data

Dec. 24, 2002  (JP)  ............ 2002-373275

(51) Int. Cl.
*F17D 1/00*  (2006.01)
(52) U.S. Cl. .......... 137/255; 141/290; 429/12
(58) Field of Classification Search .......... 137/255, 137/256, 263; 141/290; 429/12, 22, 25, 429/13, 17, 19, 218.2
See application file for complete search history.

(56) References Cited

U.S. PATENT DOCUMENTS

| | | | | |
|---|---|---|---|---|
| 5,229,222 A | * | 7/1993 | Tsutsumi et al. | 429/19 |
| 5,357,996 A | * | 10/1994 | Ioannides et al. | 137/12 |
| 5,673,735 A | * | 10/1997 | Crvelin et al. | 141/197 |
| 5,728,483 A | * | 3/1998 | Fujitani et al. | 429/12 |
| 5,797,269 A | * | 8/1998 | Nishimura et al. | 62/46.2 |
| 6,182,717 B1 | * | 2/2001 | Yamashita | 141/82 |
| 6,602,628 B2 | * | 8/2003 | Ueda et al. | 429/25 |
| 6,651,701 B2 | * | 11/2003 | Kuriiwa et al. | 141/4 |
| 6,834,508 B2 | * | 12/2004 | Bradley et al. | 62/46.1 |
| 6,861,168 B2 | * | 3/2005 | Shimada et al. | 429/20 |
| 6,924,054 B2 | * | 8/2005 | Prasad et al. | 429/34 |
| 2002/0136942 A1 | * | 9/2002 | Kashiwagi | 429/34 |
| 2003/0008185 A1 | * | 1/2003 | Sugino et al. | 429/13 |
| 2003/0180599 A1 | * | 9/2003 | Kamihara | 429/34 |
| 2004/0023083 A1 | * | 2/2004 | Yang et al. | 429/13 |

FOREIGN PATENT DOCUMENTS

| | | |
|---|---|---|
| JP | 09-142803 A | 6/1997 |
| JP | 2002-089793 | 3/2002 |
| JP | 2002-180906 A | 6/2002 |
| JP | 2002-221298 A | 8/2002 |
| JP | 2002-241772 A | 8/2002 |

* cited by examiner

*Primary Examiner*—John Rivell
*Assistant Examiner*—Craig Price
(74) *Attorney, Agent, or Firm*—Arent Fox LLP

(57) ABSTRACT

A hydrogen supply method using an inexpensive and compact hydrogen supply means to reduce a pressure of hydrogen stored in the hydrogen supply means and to supply efficiently hydrogen to a high pressure hydrogen storage means. Hydrogen is supplied under high pressure from first hydrogen supply means and from second hydrogen supply means containing a hydrogen absorbing alloy to a hydrogen storage means for storing hydrogen under high pressure. Hydrogen is supplied from the first hydrogen supply means to the hydrogen storage means until the pressure in the hydrogen storage means reaches a predetermined pressure. Thereafter, hydrogen is supplied from the second hydrogen supply means to the hydrogen storage means until the pressure in the hydrogen storage means reaches a maximum filling pressure. A plurality of the first hydrogen supply means or a plurality of the second hydrogen supply means may be used.

9 Claims, 3 Drawing Sheets

HYDROGEN SUPPLY METHOD

BACKGROUND OF THE INVENTION

1. Field of the Invention

The present invention relates to a method for supplying hydrogen, for example, to high pressure hydrogen tanks mounted on vehicles and the like which use fuel cells.

2. Description of the Related Art

In these years, it has been investigated to use fuel cells as power source for vehicles and the like. In an above described vehicle which uses a fuel cell (hereinafter abbreviated as a fuel cell vehicle), a high pressure hydrogen tank is mounted on the vehicle for storing hydrogen used as fuel for the fuel cell.

Conventionally, rapid filling methods have been known as the method for supplying hydrogen to a high pressure hydrogen tank mounted on a fuel cell vehicle (see, for example, Japanese Patent Laid-Open No. 2002-89793).

As FIG. 4 shows, the above described rapid-filing method supplies hydrogen from a hydrogen supply means 3, comprising an in-station high pressure hydrogen tank HS 1 installed at a station and an on-off valve 2, to an in-fuel-cell-vehicle high pressure hydrogen tank HV 9 mounted on a fuel cell vehicle 8 by connecting a hydrogen duct 7 to the tank HV 9 by virtue of the pressure difference between these two tanks.

According to the method illustrated in FIG. 4, after the hydrogen duct 7 has been connected, the on-off valves 2, 10 are opened to start the hydrogen supply from the tank HS 1 to the tank HV 9, and the hydrogen supply is completed on equilibration between the hydrogen pressure in the tank HS1 and the hydrogen pressure in the tank HV 9.

However, the above described conventional method has a disadvantage that when hydrogen tries to be supplied up to the maximum filling pressure of the tank HV 9, the hydrogen pressure in the tank HS 1 which stores hydrogen, a flammable gas, becomes high and moreover a large storage amount of hydrogen is needed. Additionally, there is another disadvantage that the total amount of hydrogen contained in the tank HS 1 cannot be transferred to the tank HV 9 in such a way that when the hydrogen pressure in the tank HS 1 and the hydrogen pressure in the tank HV 9 become equilibrated with each other, some hydrogen remains untransferred in the tank HS 1.

Instead of adopting the method illustrated in FIG. 4, hydrogen may be supplied by a cascade method in which two or more tanks HS 1 are arranged and the two or more tanks HS 1 are successively changed over from one to another; however, in this connection, it has been known that at least one of these tanks HS 1 is required to have an initial hydrogen pressure of 42 MPa or more. Accordingly, the above described cascade method cannot offer any solutions to the above described problems.

SUMMARY OF THE INVENTION

The present invention takes as its object the provision of a hydrogen supply method which can overcome such problems as described above and can reduce, by use of an inexpensive and compact means for supplying hydrogen, the pressure of the hydrogen stored in the means for supplying hydrogen, and moreover can supply hydrogen efficiently to a means for storing high pressure hydrogen.

Instead of the above described method in which hydrogen is supplied from the in-station high pressure hydrogen tank to the in-fuel-cell-vehicle high pressure hydrogen tank by taking advantage of the pressure difference therebetween, a method is conceivable in which a tank containing a hydrogen absorbing alloy is installed at the above described hydrogen supply station, and the hydrogen stored in the hydrogen absorbing alloy is supplied to the in-fuel-cell-vehicle high pressure hydrogen tank. The hydrogen absorbing alloy can release almost all the amount of the absorbed hydrogen, and hence hydrogen supply stations are expected to be downsized. On the other hand, hydrogen absorbing alloys are expensive so that if every hydrogen supply station is equipped with a tank containing a hydrogen absorbing alloy, initial cost increase cannot be avoided.

Accordingly, the hydrogen supply method of the present invention is a method which, for the purpose of achieving the above described objects, supplies hydrogen to a hydrogen storage means for storing hydrogen under high pressure from a first hydrogen supply means for supplying hydrogen stored under high pressure and a second hydrogen supply means for supplying hydrogen absorbed in a hydrogen absorbing alloy, wherein the method comprises a step for supplying hydrogen from the first hydrogen supply means to the hydrogen storage means until the hydrogen pressure in the hydrogen storage means reaches a predetermined pressure, and a step for supplying hydrogen, subsequently to the above described step, from the second hydrogen supply means to the hydrogen storage means until the hydrogen pressure in the hydrogen storage means reaches the maximum filling pressure.

In the hydrogen supply method of the present invention, at the beginning, hydrogen stored under high pressure is supplied from the first hydrogen supply means to a hydrogen storage means for storing hydrogen under high pressure such as a high pressure hydrogen tank mounted on a fuel cell vehicle or the like. The first hydrogen supply means supplies hydrogen by taking advantage of the pressure difference between itself and the above described hydrogen storage means, and thus can effectively supply hydrogen when the hydrogen pressure in the hydrogen storage means is relatively low. Thus, the first hydrogen supply means supplies hydrogen until the hydrogen pressure in the hydrogen storage means reaches a predetermined pressure, for example, a pressure in equilibrium with the hydrogen pressure in the first hydrogen supply means.

In the hydrogen supply method of the present invention, when the hydrogen pressure in the hydrogen storage means reaches a predetermined pressure, successively a change over is made from the above described first hydrogen supply means to the second hydrogen supply means that supplies the hydrogen absorbed in the hydrogen absorbing alloy. The hydrogen absorbing alloy has an approximately constant hydrogen release pressure in the plateau region of the pressure-composition isothermal diagram, and hence by using a hydrogen absorbing alloy in which the hydrogen release pressure corresponds to the maximum filling pressure of the hydrogen storage means, nearly all the amount of the hydrogen absorbed in the hydrogen absorbing alloy can be supplied to the hydrogen storage means.

The second hydrogen supply means for supplying the hydrogen absorbed in the above described hydrogen absorbing alloy can effectively supply hydrogen when the pressure difference between the hydrogen pressure in the above described hydrogen storage means and the maximum filling pressure is small. Thus, the second hydrogen supply means supplies hydrogen to the hydrogen storage means, after the hydrogen pressure in the hydrogen storage means has reached the above predetermined pressure, until the hydrogen pressure in the hydrogen storage means reaches the maximum filling pressure.

According to the hydrogen supply method of the present invention, the first hydrogen supply means is used when the hydrogen pressure in the hydrogen storage means is relatively low, while the second hydrogen supply means is used when the pressure difference between the hydrogen pressure in the above described hydrogen storage means and the maximum filling pressure is small; accordingly, the pressure of the hydrogen stored in the first hydrogen supply means can be reduced and the whole system can thereby be downsized, and moreover, hydrogen can be efficiently supplied to the hydrogen storage means for storing hydrogen under high-pressure. Additionally, the hydrogen supply means can be made inexpensive because the first hydrogen supply means for supplying hydrogen stored under high pressure is used in combination with the second hydrogen supply means for supplying the hydrogen stored in the hydrogen absorbing alloy.

In the hydrogen supply method of the present invention, a plurality of the first hydrogen supply means and a plurality of the second hydrogen supply means may be used. In this case, the plurality of first hydrogen supply means are arranged in parallel with each other and successive change over is made from one to another, and hydrogen is thereby supplied until the hydrogen pressure in the hydrogen storage means reaches a predetermined pressure. Alternatively, a plurality of the second hydrogen supply means are arranged in parallel with each other, and after the hydrogen pressure in the hydrogen storage means has reached the above predetermined pressure, by successively changing over the plurality of the second hydrogen supply means, hydrogen is supplied until the hydrogen pressure in the hydrogen storage means reaches the maximum filling pressure.

DETAILED DESCRIPTION OF THE PREFERRED EMBODIMENTS

More detailed description will be made below on the embodiments of the present invention with reference to the accompanying drawings.

First of all, description will be made on a first embodiment of the hydrogen supply method of the present invention.

Figure 1:
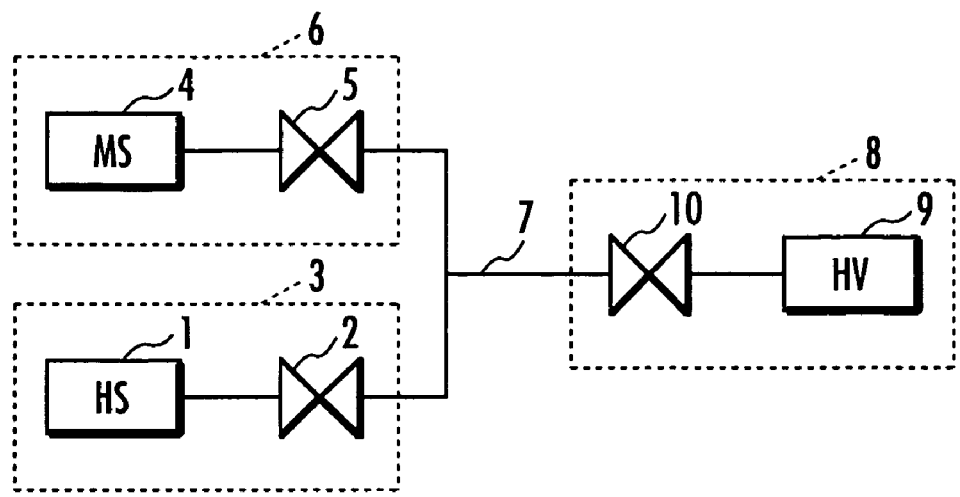
FIG. 1 is a block diagram illustrating one embodiment of the present invention.

The hydrogen supply station used in the present embodiment comprises, for example as shown in FIG. 1, a first hydrogen supply means 3 comprising an in-station high pressure hydrogen tank HS 1 and an on-off valve 2 and a second hydrogen supply means 6 comprising a tank MS 4 containing a hydrogen absorbing alloy and an on-off valve 5. Thus, the method of the present embodiment supplies hydrogen by connecting through a hydrogen duct 7 the first hydrogen supply means 3 and the second hydrogen supply means 6 to an in-fuel-cell-vehicle high pressure hydrogen tank HV 9 mounted on a fuel cell vehicle 8. The tank HV 9 has a hydrogen storage capacity of 36.3 Nm$^3$ and a maximum filling pressure of 35 MPa, and comprises an on-off valve 10.

In order to supply hydrogen to the tank HV 9 having the above described maximum filling pressure, the tank HS 1 used is the one which has a hydrogen storage capacity of 21 Nm$^3$ and an initial hydrogen pressure of 7 to 35 MPa, for example, 35 MPa. The tank HS 1 has an outside volume of 72 liters.

On the other hand, the tank MS 4 has a hydrogen storage capacity of 22 Nm$^3$ and an outside volume of 127 liters. Consequently, the sum of the outside volumes of the tank HS 1 and the tank MS 4 amounts to 199 liters.

Additionally, for the purpose of supplying almost all the amount of the stored hydrogen to the tank HV 9, the tank MS 4 contains a hydrogen absorbing alloy having a hydrogen release pressure in the plateau region in the pressure-composition isothermal diagram, corresponding to the above described maximum filling pressure of the tank HV 9. Examples of the above described hydrogen absorbing alloy include, for example, an alloy having a composition of $Ti_{0.9}Zr_{0.1}Mn_{1.4}Cr_{0.4}V_{0.2}$. The hydrogen absorbing alloy having this composition has a hydrogen absorption pressure of 15 MPa at the absorption temperature of 30° C. and a hydrogen release pressure of 34.8 MPa at a release temperature of 140° C., thus having a hydrogen release pressure nearly equal to the above described maximum filling pressure of the tank HV 9.

In the present embodiment, when hydrogen is supplied to the fuel cell vehicle 8, at the beginning, the on-off valve 2 of the first hydrogen supply means 3 and the on-off valve 10 of the tank HV 9 are opened under the condition that the on-off valve 5 of the second hydrogen supply means 6 is closed. In this way, the hydrogen stored in the tank HS 1 is supplied through the hydrogen duct 7 to the tank HV 9 by virtue of the pressure difference between the tank HS 1 and the tank HV 9. Since the initial hydrogen pressure in the tank HS 1 is 35 MPa, in case where the hydrogen pressure in the tank HV 9 nearly vanishes, the pressure difference between the tank HS 1 and the tank HV 9 reaches equilibrium to complete the hydrogen supply by the first hydrogen supply means 3 when the hydrogen pressure in the tank HV 9 reaches about 10 MPa.

Then, the on-off valve 2 of the first hydrogen supply means 3 is closed, the on-off valve 5 of the second hydrogen supply means 6 is opened, and the above described hydrogen absorbing alloy contained in the tank MS 4 is heated to the above described hydrogen release temperature to release the hydrogen stored in the hydrogen absorbing alloy. As described above, the hydrogen absorbing alloy has a hydrogen release pressure nearly equal to the above described maximum filling pressure of the tank HV 9, and hence hydrogen is supplied until the hydrogen pressure in the tank HV 9 reaches the maximum filling pressure. Successively, the on-off valve 5 of the first hydrogen supply means 2 and the on-off valve 10 of the tank HV 9 are closed and the hydrogen duct 7 is disconnected from the tank HV 9 to complete the hydrogen supply by the second hydrogen supply means 6.

According to the hydrogen supply method of the present invention, the tank HS 1 of the first hydrogen supply means 3 and the tank MS 4 of the second hydrogen supply means 6 are successively changed over, and accordingly hydrogen can be efficiently supplied to the tank HV 9.

Then, description will be made below on a second embodiment of the present invention.

Figure 2:
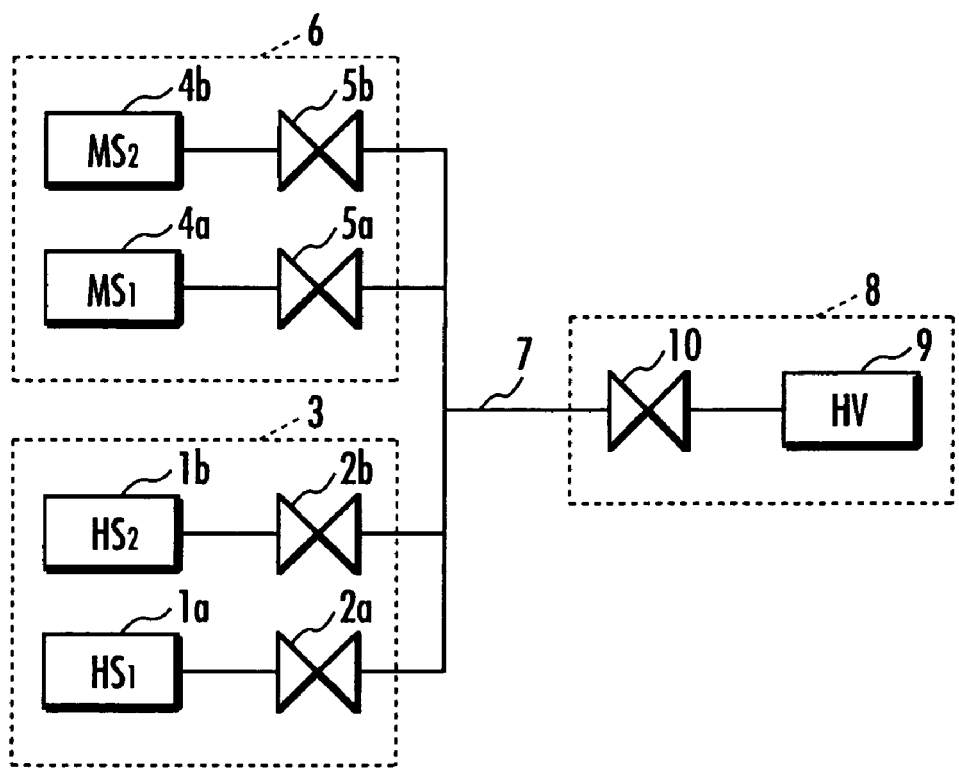
FIG. 2 is a block diagram illustrating another embodiment of the present invention.

In the hydrogen supply station used in the present embodiment, a first hydrogen supply means 3 comprises, for example as FIG. 2 shows, two in-station high pressure hydrogen tanks $HS_1$ 1a and $HS_2$ 1b and on-off valves 2a and 2b respectively equipped for the tanks $HS_1$ 1a and $HS_2$ 1b. The tank $HS_1$ 1a has a hydrogen storage capacity of 13.4 $Nm^3$ and an initial hydrogen pressure of 35 MPa, while the tank $HS_2$ 1b also has a hydrogen storage capacity of 13.4 $Nm^3$ and an initial hydrogen pressure of 35 MPa. The tanks $HS_1$ 1a and $HS_2$ 1b each has an outside volume of 46 liters.

On the other hand, a second hydrogen supply means 6 comprises two tanks $MS_1$ 4a and $MS_2$ 4b containing a hydrogen absorbing alloy and on-off valves 5a and 5b respectively equipped for the tanks $MS_1$ 4a and $MS_2$ 4b. The tank $MS_1$ 4a has a hydrogen storage capacity of 9 $Nm^3$ and contains a hydrogen absorbing alloy having a hydrogen release pressure of 24.1 MPa at a release temperature of 100° C., while the tank $MS_2$ 4b has a hydrogen storage capacity of 9 $Nm^3$ and contains a hydrogen absorbing alloy having a hydrogen release pressure of 34.8 MPa at a release temperature of 140° C. The tanks $MS_1$ 4a and $MS_2$ 4b each has an outside volume of 52 liters. Consequently, the sum of the outside volumes of the tanks $HS_1$ 1a and $HS_2$ 1b and the outside volumes of the tanks $MS_1$ 4a and $MS_2$ 4b amounts to 196 liters.

In the method of the present embodiment, hydrogen is supplied by connecting through the hydrogen duct 7 the first hydrogen supply means 3 and the second hydrogen supply means 6 to the in-fuel-cell-vehicle high pressure hydrogen tank HV 9 mounted on the fuel cell vehicle 8. Incidentally, the tank HV 9 is the same one as used in the first embodiment.

Figure 3:
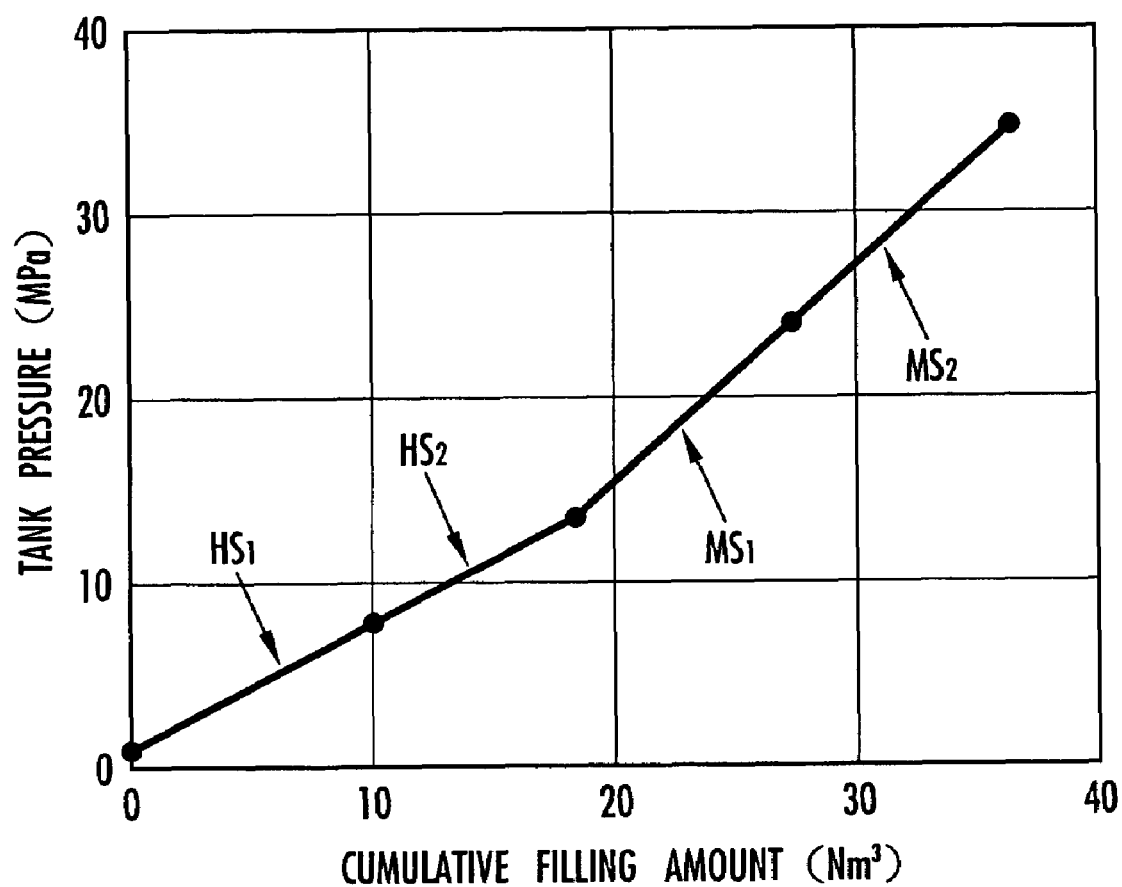
FIG. 3 is a graph showing the relation between the cumulative filling amount in an in-fuel-cell-vehicle high pressure hydrogen tank and the tank pressure in the embodiment illustrated in FIG. 2.

Now, description will be made below on the hydrogen supply method according to the present embodiment with reference to FIGS. 2 and 3.

In the present embodiment, when hydrogen is supplied to the fuel cell vehicle 8, at the beginning the on-off valve 2a of the first hydrogen supply means 3 and the on-off valves 10 of the tank HV 9 are opened under the condition that the on-off valve 2b of the first hydrogen supply means 3 and the on-off valves 5a and 5b of the second hydrogen supply means 6 are closed. In this way, the hydrogen stored in the tank $HS_1$ 1a is supplied through the hydrogen duct 7 to the tank HV 9 by virtue of the pressure difference between the tank $HS_1$ 1a and the tank HV 9. Consequently, as FIG. 3 shows, when the hydrogen pressure (tank pressure) in the tank HV 9 reaches 7.9 MPa and the cumulative filling amount in the tank HV 9 reaches 10.2 $Nm^3$, the pressure difference between the tank $HS_1$ 1a and the tank HV 9 reaches equilibrium to complete the supply from the tank $HS_1$ 1a.

Then, the on-off valve 2a of the first hydrogen supply means 3 is closed, and the on-off valve 2b of the same means 3 is opened. In this way, the hydrogen stored in the tank $HS_2$ 1b is supplied to the tank HV 9 through the hydrogen duct 7 by virtue of the pressure difference between the tank $HS_2$ 1b and the tank HV 9. Consequently, as FIG. 3 shows, when the hydrogen pressure in the tank HV 9 reaches 13.4 MPa and the cumulative filling amount reaches 18.3 $Nm^3$, the pressure difference between the tank $HS_2$ 1b and the tank HV 9 reaches equilibrium to complete the hydrogen supply from the tank $HS_2$ 1b. Thus, the hydrogen supply by the first hydrogen supply means 3 is completed.

Then, the on-off valve 2b of the first hydrogen supply means 3 is closed, the on-off valve 5a of the second hydrogen supply means 6 is opened, and the above described hydrogen absorbing alloy contained in the tank $MS_1$ 4a is heated to the above described hydrogen release temperature to release the hydrogen stored in the hydrogen absorbing alloy. Consequently, as FIG. 3 shows, when the hydrogen pressure in the tank HV 9 reaches 24.1 MPa and the cumulative filling amount in the tank HV 9 reaches 27.3 $Nm^3$, all the amount of the hydrogen stored in the above described hydrogen absorbing alloy is released to complete the hydrogen supply from the tank $MS_1$ 4a.

Then, the on-off valve 5a of the second hydrogen supply means 6 is closed, the on-off valve 5b of the second hydrogen supply means 6 is opened, and the above described hydrogen absorbing alloy contained in the tank $MS_2$ 4b is heated to the above described hydrogen release temperature to release the hydrogen stored in the hydrogen absorbing alloy. Consequently, as FIG. 3 shows, when the hydrogen pressure in the tank HV 9 reaches 34.8 MPa and the cumulative filling amount in the tank HV 9 reaches 36.3 $Nm^3$, all the amount of the hydrogen stored in the above described hydrogen absorbing alloy is released to complete the hydrogen supply from the tank $MS_2$ 4b. Successively, the on-off valve 5b of the second hydrogen supply means 6 is closed to complete the hydrogen supply by the second hydrogen supply means 6.

According to the hydrogen supply method of the present embodiment, successive change over is made from the tanks $HS_1$ 1a and $HS_2$ 1b of the first hydrogen supply means 3 to the tanks $MS_1$ 4a and $MS_2$ 4b of the second hydrogen supply means 6, and hence hydrogen can be efficiently supplied to the tank HV 9.

Now, description will be made below on a comparative example of the present invention.

Figure 4:
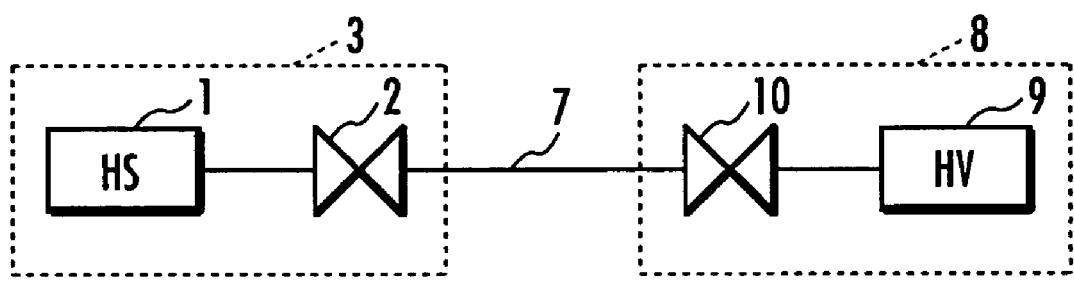
FIG. 4 is a block diagram illustrating a conventional hydrogen supply method.

The hydrogen supply station used in the present comparative example comprises, as FIG. 4 shows, a hydrogen supply means 3 comprising an in-station high-pressure hydrogen tank HS 1 and an on-off valve 2. The method of the present comparative example supplies hydrogen by connecting through a hydrogen duct 7 the hydrogen supply means 3 to an in-fuel-cell-vehicle high pressure hydrogen tank HV 9 mounted on a fuel cell vehicle 8. Incidentally, the tank HV 9 has a hydrogen storage capacity of 36.3 $Nm^3$ and a maximum filling pressure of 35 MPa, and comprises an on-off valve 10.

In order to supply hydrogen to the tank HV 9 having the above described maximum filling pressure, the tank HS 1 used is the one which has a hydrogen storage capacity of 260 $Nm^3$ and an initial hydrogen pressure of 42 MPa. The tank HS 1 has an outside volume of 900 liters.

In the present comparative example, when hydrogen is supplied to the fuel cell vehicle 8, at the beginning the on-off valve 2 of the hydrogen supply means 3 and the on-off valve 10 of the tank HV 9 are opened. In this way, the hydrogen stored in the tank HS 1 is supplied to the tank HV 9 through the hydrogen duct 7 by virtue of the pressure difference between the tank HS 1 and the tank HV 9. When the hydrogen pressure in the tank HV 9 reaches about 35 MPa, the pressure difference between the tank HS 1 and the tank HV 9 reaches equilibrium to complete the hydrogen supply by the first hydrogen supply means 3.

As described above, it has been revealed that, according to the methods of the present embodiments, as compared to the above described comparative example, the initial hydrogen pressure in the in-station high pressure hydrogen tank HS 1, or the initial hydrogen pressures in the in-station high pressure tanks $HS_1$ 1a and $HS_2$ 1b can be reduced, and the sum of the outside volumes of each tank can be made smaller.

Additionally, according to the methods of the present embodiments, the high pressure hydrogen tank HS 1 is used in combination with the tank MS 1 containing a hydrogen absorbing alloy, or the high pressure hydrogen tanks $HS_1$ 1a and $HS_2$ 1b are used in combination with the tanks $MS_1$ 4a and $MS_2$ 4b each containing a hydrogen absorbing alloy, and hence a hydrogen supply system can be constructed more inexpensively as compared to the case in which a hydrogen supply station is constructed solely with a tank or tanks each containing a hydrogen absorbing alloy.

What is claimed is:

1. A hydrogen supply method for supplying hydrogen to a hydrogen storage means for storing hydrogen under high pressure from a first hydrogen supply means for supplying hydrogen stored under high pressure and a second hydrogen supply means for supplying hydrogen stored in a hydrogen absorbing alloy, comprising steps of:

supplying hydrogen from the first hydrogen supply means to said hydrogen storage means until the hydrogen pressure in said hydrogen storage means reaches a predetermined pressure; and supplying hydrogen, subsequently to the above described step, from the second hydrogen supply means for supplying hydrogen stored in a hydrogen absorbing alloy to said hydrogen storage means until the hydrogen pressure in said hydrogen storage means reaches a maximum filling pressure, wherein the step of supplying hydrogen from the second hydrogen supply means to the hydrogen storage means comprises terminating the first hydrogen supply means to said hydrogen storage means at the predetermined pressure.

2. The hydrogen supply method according to claim 1, wherein the step for supplying hydrogen from the first hydrogen supply means to said hydrogen storage means supplies hydrogen until the hydrogen pressure in said hydrogen storage means reaches equilibrium with the hydrogen pressure in the first hydrogen supply means.

3. The hydrogen supply method according to claim 1, wherein the first hydrogen supply means supplies hydrogen stored at from 7 to 35 MPa.

4. The hydrogen supply method according to claim 1, wherein said hydrogen absorbing alloy is an alloy having a composition of Ti0.9Zr0.1Mn1.4Cr0.4V0.2.

5. The hydrogen supply method according to claim 1, wherein a plurality of the first hydrogen supply means are arranged in parallel with each other and the respective first hydrogen supply means are successively changed over from one to another to supply hydrogen to said hydrogen storage means.

6. The hydrogen supply method according to claim 5, wherein two of the first hydrogen supply means are arranged in parallel with each other and the respective first hydrogen supply means are changed over successively from one to the other to supply hydrogen to said hydrogen storage means.

7. The hydrogen supply method according to claim 1, wherein a plurality of the second hydrogen supply means are arranged in parallel with each other and the respective second hydrogen supply means are successively changed over from one to another to supply hydrogen to said hydrogen storage means.

8. The hydrogen supply method according to claim 7, wherein two of the second hydrogen supply means are arranged in parallel with each other and the respective second hydrogen supply means are changed over successively from one to the other to supply hydrogen to said hydrogen storage means.

9. The hydrogen supply method according to claim 1, wherein said hydrogen storage means is a high pressure hydrogen tank mounted on a vehicle using a fuel cell.

* * * * *